United States Patent [19]

Lee et al.

[11] 3,873,961

[45] Mar. 25, 1975

[54] METHOD AND APPARATUS FOR SYNCHRONIZING MODULAR SEISMIC SYSTEM

[75] Inventors: Robert E. Lee, Houston; William R. Orr, Bellaire, both of Tex.

[73] Assignee: Shell Oil Company, New York, N.Y.

[22] Filed: Sept. 6, 1973

[21] Appl. No.: 394,904

[52] U.S. Cl. ... 340/15.5 TS, 179/15 BS, 340/310 A
[51] Int. Cl. ........................... G01v 1/16, G01v 1/26
[58] Field of Search .......... 340/15.5 TS, 15.5 MC, 340/15.5 GC, 310 A, 147 SY, 151; 179/15 BS

[56] References Cited
UNITED STATES PATENTS
3,541,257    2/1970    McCormick .................... 178/22
3,652,979    3/1970    Angelle ...................... 340/15.5 TS
3,748,638    7/1973    Montgomery, Jr. ............. 340/15.5 TS
3,806,864    4/1974    Broding et al ................ 340/15.5 DP Primary Examiner—Maynard R. Wilbur
Assistant Examiner—H. A. Birmiel

[57] ABSTRACT

A method and apparatus for synchronizing a modular seismic system wherein each seismic station includes a data acquisition module having means for sampling the geophone signal, a gain ranging amplifier adjusting the gain of the signal amplifier and an analog to digital converter converting the amplified signal to digital form. The module also includes means for transmitting to succeeding stations digital signals received from previous stations and its own digital signal. All of the modules are coupled in series by coaxial cables while power is supplied over a separate two-conductor power cable. A coded word is transmitted over the power cable to synchronize the sampling of the geophone signal and control operation of the module.

8 Claims, 2 Drawing Figures

PATENTED MAR 25 1975    3,873,961

METHOD AND APPARATUS FOR SYNCHRONIZING MODULAR SEISMIC SYSTEM

RELATED APPLICATIONS

The present application is related to a copending application with the same assignee, Ser. No. 196,400, now U.S. Pat. No. 3,748,638, filed Nov. 8, 1971 and entitled SEISMIC EXPLORATION SYSTEM.

BACKGROUND OF THE INVENTION

The present invention relates to seismic data acquisition systems and particularly to a modular seismic system. In a modular seismic system, each geophone station is provided with a data acquisition module with the individual modules being coupled to each other in series by means of a coaxial cable with the last module being coupled to a recording system. Each module includes means for sampling the geophone signal at the station, amplifying the signal while adjusting the gain of the amplifier and then coverting the amplified signal to a corresponding digital signal. The digital signal includes a digital number for indicating the gain of the amplifier. The module has provisions for receiving the digital data from preceding modules and retransmitting it to the next station while adding its own data to the transmission. All operations of the module are under the control of a local clock. This type of system is more fully described and claimed in the above referenced copending application.

While the module system described in the copending application has been successfully used, it does have the problem of a lack of synchronization of the operation of the individual modules. While crystal controlled clocks are used for accuracy, there is a slight difference in the time at which the individual geophone signals are sampled. While the singular term geophone signal is used when describing each station, each station in fact includes a plurality of geophones, for example twelve which are placed in a particular pattern with their signals being combined in parallel and series to effectively cancel out ground waves and extraneous surface noise. Thus, while the system of the copending application solves the problem of multiple conductor cables formerly used to couple all of the seismic stations to a recording system, it does have the problem of lack of synchronization of the time when the seismic signal is sampled and control of the module's functions.

BRIEF SUMMARY OF THE INVENTION

The present system solves the above problem by providing a means by which the time when the individual geophone signals are sampled can be accurately synchronized from the central recording location. The synchronizing system utilizes the power cable to transmit a coded word to all of the modules with each of the modules including a means for decoding the word and utilizing it to synchronize the time at which the geophone data is sampled.

The power is provided in the form of discrete pulses usually of fixed frequency and is used to charge batteries in the individual modules. Thus, the power supply may be used to transmit a coded digital word for synchronizing the individual modules. Each of the modules is provided with a decoding circuit which decodes the transmitted word and generates suitable signals for operating the individual module and synchronizing the time when the geophone signal is sampled. For example, the power supply may have a fixed frequency of 1125 Hz and the coded word may consist of a 17 bit digital word with the transmission of a consecutive number of logic ones being used to indicate the arrival of the synchronizing word. For example, a zero and eight consecutive ones can be utilized for indicating the arrival of the coded word while the remaining 8 bits in the digital word are used for different control functions and for synchronizing the module. A shift register can be used to detect the transmission of eight consecutive logic ones. The signals that control the operation of the module can be transmitted from the shift register to latch circuits where they will be retained until a suitable signal is provided for transmitting them to the individual elements of the module. For example, when the shift register detects the arrival of a coded word, it can be used to open a gate which then controls a transfer clock to transfer a clock pulse from the digital clock of the module to the latch circuits to operate the latch circuits. The clock pulse can also be supplied to the sample and hold circuit to cause it to sample the geophone data at the same time. Examples of functions controlled by the coded word are the providing of a fixed or automatic gain mode for the gain ranging amplifier of the module, and when in the fixed gain mode, provide a signal indicating the amount of gain desired. The signals can also be used for controlling the application of power to the module so that the module is only powered when the geophones are actually generating data. This will conserve the batteries used for powering the module and provide additional time for recharging the batteries. Of course, a small part of the module must remain ON in order to receive commands.

In addition to the above features, the system also includes the generation of a local clock signal for decoding the coded command words. In order to provide close synchronization, the local clock signal is synchronized with the pulses in the power supply. For example, the local clock signal can be synchronized for each positive going pulse in the power supply signal. Of course, during the transmission of logic ones, it will be impossible to synchronize the local clock but this requires a relatively short time and no loss of clock synchronization will be introduced. This is especially true since the local clock is a crystal controlled clock and variations in frequency during short intervals will be small.

While it is possible to transmit a continuous sequence of coded words to continuously synchronize the instant at which the geophone data is sampled, this normally is not necessary due to the crystal control of the local clocks. Thus, it has been found satisfactory if a coded word is transmitted upon the initiation of a seismic disturbance or every ten seconds. Since seismic data is normally recorded over a time interval of six to ten seconds, this means that initial sampling of the geophone signals will be synchronized and then the individual modules will run free under the control of their local clocks. Due to the accuracy of a crystal controlled clock no large clock deviation with respect to the data are introduced by this method of operation. Further, the use of the relatively low frequency of the power supply eliminates the possibility of interference with the transmission of the digital seismic data on the coaxial cable since the transmitted data has a much higher frequency then the frequency of the power supply.

BRIEF DESCRIPTION OF THE DRAWINGS

The invention will be more easily understood from the following detailed description of a preferred embodiment when taken in conjunction with the attached drawings in which.

DESCRIPTION OF PREFERRED EMBODIMENT

Figures 1, 2:
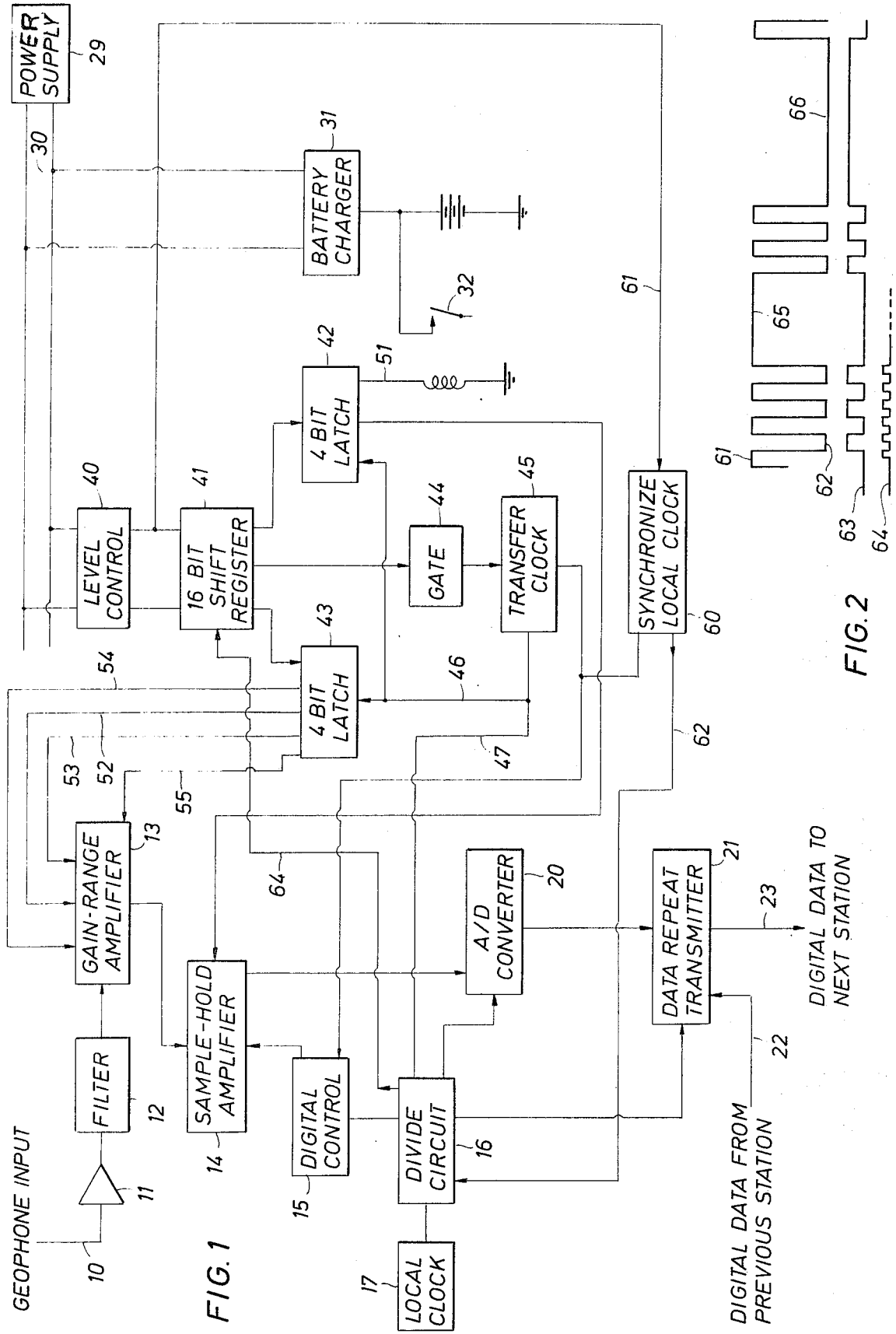
FIG. 1 is a block diagram of an individual module of the system.
FIG. 2 is a series of wave forms indicating the coded word and the local clock pulse.

Referring now to FIG. 1, there is shown a modular system substantially the same as that shown and described in the above copending application and the present description will be limited to the main elements of the system. The geophone spread is coupled to the geophone input 10 of the preamplifier 11 and filter 12. The output from the preamplifier-filter arrangement is supplied to the gain ranging amplifier 13 which comprises a system for adjusting the gain of the amplifier so that the amplified output signal from the geophone remains between predetermined limits. The amplification is controlled in discrete steps so that the actual gain used can easily be converted to a digital number. The output of the gain ranging amplifier is supplied to a sample and hold amplifier 14 which, when triggered by the digital control 15 samples the instantaneous amplitude of the amplified geophone signal. The magnitude of this sample is supplied to an analog to digital converter 20 where the signal is converted to a digital quantity. This digital quantity is then supplied to the data repeat transmitter 21 which transmits the data received over coaxial cable 22 from the previous modules together with the data from the present module over the coaxial cable 23 to the next station. As explained above, the individual modules are coupled to each other by means of coaxial cable.

All of the above described circuits are controlled by a local clock 17, for example, a crystal controlled clock having a frequency of 14.4 MHz. The clock frequency is supplied to a divide circuit 16 which supplies various sub-frequencies from the clock frequency for powering the digital control that controls the sample and hold amplifier, the frequency used for generating the digital output in the analog to digital converter and the control of the data repeat transmitter 21.

The synchronizing circuit of the present invention utilizes a data word transmitted over the power leads 30 that supply power to the individual modules. The power supply 29 produces both regular pulses of the power supply and the synchronizing word that is included in the regular power pulses. It is preferable that the individual modules operate off of battery supply to limit the power that must be transmitted over the power leads 30. Most seismic systems only transmit data during short time intervals, for example, 6 to 10 seconds after the generation of a seismic disturbance and then are at rest for a considerable interval of time. During the rest period, the battery charger 31 can charge the batteries at a slow rate and thus reduce the average power requirements of the system. A switch means 32 is provided in te discharge side of the battery for controlling the powering of the module. Thus, under normal conditions, the components will be shut off and only turned on at the time of the generation of the seismic disturbance.

The synchronizer includes a level control 40 that reduces the voltage level of the power supply to a level that can be accepted by solid state devices, for example it is convenient to use 30 volts for the power supply for charging the battery while most solid state devices operate an approximately 5 volts. The reduced amplitude signal is supplied to a synchronizing local clock 60 and to a 16 bit shift register 41. The shift register is designed so that when the proper synchronizing word, for example, seven succeeding logic ones are transmitted, it will operate the gate 44. At the same time that the shift register is receiving the synchronizing word, it will supply the remaining bits of the coded word to the two 4 bit latch circuits 42 and 43. The latch circuits, of course, will retain the commands represented by the bits until they are triggered by a suitable signal. The gate 44, when opened by the shift register 41, transmits a pulse to the transfer clock 45. The transfer clock will transmit one of the clock pulses from the divide circuit 16 over the lead 46 to the two latch circuits 42 and 43 and a pulse to the digital control 15 over the lead 47. Thus, when the gate responds to the the coded the two latch circuits will be triggered and the digital control 15 will be triggered. More particularly, the digital control 15 consists of, among other things, a counter which divides the 14.4 Mhz clock 17 by 800 to obtain 18 khz which is used in sequencing te A/D converter 20. The divide by 800 counter in the digital control is cleared by the signal from the transfer clock 45. The signal from the transfer clock 45 also actuates the sample and hold amplifier 14 and te convert command of the A/D converter 20. Accordingly, since the counters of all of the modules are cleared at the same time, they will all trigger the sample and hold amplifiers at the same time. Of course, any slight difference in phase or frequency between the local clocks will change the exact instant at which the sample and hold amplifier is triggered. This difference will be so small that it will be of no importance in the frequencies used in normal seismic operations. A suitable counter type for the digital control 15 is one manufactured by Signetics, Inc. of Sunnyvale, Cal. and known as Model 8281counter. The transfer clock 45 receives a frequency from the divide circuit 16 which frequency pulses are used to provide the pulses of the leads 46 and 47. The synchronizing local clock 60 also receives this frequency and zeros that portion of the divide circuit 16 which supplies the frequency over the lead 64 to the 16 bit shift register. More particularly, whenever the power supply goes positive, the synchronizing clock operates to zero the shift register in the divide circuit 16 that supplies a frequency for decoding the coded word transmitted over the power supply. This insures that the coded word can be decoded even in the absence of pulses, as for example, when a continuous logic 1 is transmitted.

The latch circuit 42 controls the turning on of power to the remainder of the module by closing the switch in the battery circuit. The switch can be a relay-operated switch which is coupled by the lead 51 to the latch circuit 42. The latch circuit 43 controls the operation of the gain ranging amplifier by means of signals supplied on leads 52, 53, 54 and 55. More particularly, the latch circuit 43 can control the gain ranging amplifier to place it either in an automatic or manual mode via lead 55. In a manual mode, the gain will be set by the signal appearing on the leads 52, 53 and 54 while in an automatic mode, it will operate to maintain the output signal within preset limits.

Operation

The operation of the synchronizing circuit can be more easily understood by referring to the wave forms in FIG. 2 and the following digital word.

| | | |
|---|---|---|
| Synchronizing word | (1 1 1 1 1 1 1 1 0) | 9 bits |
| Shift right/left | 1 = right   0 = left | 1 bit |
| Gain command | 0 = Fixed gain | |
| | 1 = autogain | |
| Fixed gain | 0 db | |
| | 12 db | |
| | 24 db | |
| | 36 db | 3 bits |
| | 48 db | |
| | 60 db | |
| | 72 db | |
| | 84 db | |
| Status | 00 = Acquire data | |
| | 01 = Unassigned | |
| | 10 = Unassigned | 2 bits |
| | 11 = Unassigned | |
| Power on/off | 0 = On | 1 bit |
| | 1 = Off | |

The wave form 60 illustrates the power supply signal comprising pulses which vary between +30 and −30 volts and having substantially square wave forms as shown by the signals 61 and 62. When one wants to transmit a series of logic zeroes, the power supply signal is maintained at a constant positive 30 volt level as shown by the portion of the wave form 65. Similarly, the transmission of logic ones is accomplished by maintaining the wave form at a constant minus 30 volts as shown by the portion 66. Thus, to transmit eight consecutive ones to trigger the shift register 41, one would maintain a −30 volts for eight clock pulses. The wave form 63 is the output signal from the level control 40 and shows the reversal of the polarity of the signal due to the level control circuit. Wave form 73 is in NRZ-C form. Similarly, the wave form 64 illustrates the clock pulses supplied by the divide circuit 16 to the shift register 41 for decoding the coded word transmitted over the power supply. The frequency of the power supply used can, of course, vary over wide limits but must bear a fixed relationship to the local clock 17 so that the local clock signal can be divided to obtain the signal 64 for decoding the coded word. For example, when a 14.4 MHz clock pulse is used, the power supply may have a frequency of 1,125 Hz while the clock pulse 64 would have a frequency of 2,250 Hz. The synchronizing clock 60 is actuated upon initiation of each positive pulse 61 of the power supply signal. As explained, when the synchronizing clock 60 is actuated, it supplies a signal over the lead 62 to clear that portion of the divide circuit 16 which is used for supplying the clock pulse 64.

The 16 bit shift register also transmits the data pulses representing the commands to other components of the system to 4 bit latches 42 and 43. The 4 bit latches accumulate the signals representing commands for other components of the system but do not transmit the command signals until the gate 44 is opened. Gate 44 is opened when the eight "ones" of the synchronizing word occupy the last eight bit positions of the 16 bit shift register 41. The gate 44 actuates the transfer clock 45 to produce pulses on the leads 46 and 47 to actuate the two 4 bit latch circuits 42 and 43 and the digital control 15. The pulse supplied to digital control 15 will reset the control to zero and it will initiate a new sampling sequence. Since the digital controls of all modules will be reset at the same time the sampling sequence for all units wil be the same. The shift register 42 will turn the power on while shift register 43 will place the gain ranging amplifier in the mode selected by the operator. After the system has been synchronized, it will continue to operate in the same manner as described in the above-referenced co-pending application.

As shown in the above data word, there are some unassigned data bits in the word that can be used to perform other functions. For example, it is possible to select only some of the stations for each seismic disturbance. This would provide various patterns of geophones without the necessity of replanting the geophones after each disturbance.

We claim as our invention:

1. A system for synchronizing a modular seismic system wherein the module for each seismic station includes a data acquisition system including sampling means, gain-ranging amplifying means and analog-to-digital converter and a data transmission system for receiving data from a previous station and re-transmitting the data to the next station while adding the data from the present station, both said data acquisition system and data transmission system being under the control of a local clock, said synchronizing system comprising:

a power cable coupled to each module in parallel and a power supply to supply a power signal to each module, said power supply having a fixed frequency and positive and negative pulses, a synchronizing signal being included in said power supply by assignment of digital values to said positive and negative pulses and controlling the sequence of said pulses to produce said synchronizing signal;

a decoder for each module, each decoder being coupled to said power cable and the local clock of each module to decode said synchronizing signal; and a digital control for each module, said digital control being coupled to the sampling means of the module to control the time when the seismic data is sampled, said decoder also being coupled to said digital control to synchronize said digital control in response to a synchronizing signal transmitted over said power cable.

2. The system of claim 1 wherein the decoder includes a shift register whose output is actuated by the transmission of a synchronizing word.

3. The system of claim 2 and in addition a gate circuit, said shift register being coupled to said gate circuit to open said gate upon receiving said synchronizing word, a source of pulses, said source of pulses being coupled to said gate circuit to transmit a pulse to said digital control to synchronize said digital control.

4. The system of claim 1 wherein said digital control includes a shift register having means for being reset to zero in response to an actuating pulse, said shift register being coupled to said local clock whereby said shift register may actuate said sampling means in response to said local clock.

5. The system of claim 4 and in addition a second shift register, said second shift register being coupled to said power cable and responsive to predetermined series of pulses on said power cable to produce a pulse to reset the shift register of said digital control.

6. The system of claim 1 wherein said power is supplied in the form of positive and negative pulses of predetermined frequency, said positive and negative pulses being used to transmit said synchronizing signal in a binary form.

7. The system of claim 1 and in addition said local clock being coupled to said power supply whereby said clock can be synchronized with said power supply.

8. A method for synchronizing a modular seismic system wherein each seismic station includes a module having means for sampling the seismic data, converting it to a digital signal and transmitting the digital signal and signals received from previous modules to succeeding modules, said modules being coupled in series by a single transmission circuit, each of said modules being under the control of a local clock, said method comprising:

supplying a fixed frequency power and having positive and negative pulses to each of said modules;

modulating said power to generate a digital synchronizing signal by assigning digital values to said positive and negative pulses and controlling the sequence of said pulses to produce said synchronizing signal;

decoding said digital synchronizing signal at each module; and utilizing the decoded synchronizing signal to control the sampling of said seismic data.

* * * * *